May 1, 1956 W. L. AMES 2,743,632
JACKET STRIPPING APPARATUS
Filed July 17, 1953 3 Sheets-Sheet 1

INVENTOR
W. L. AMES

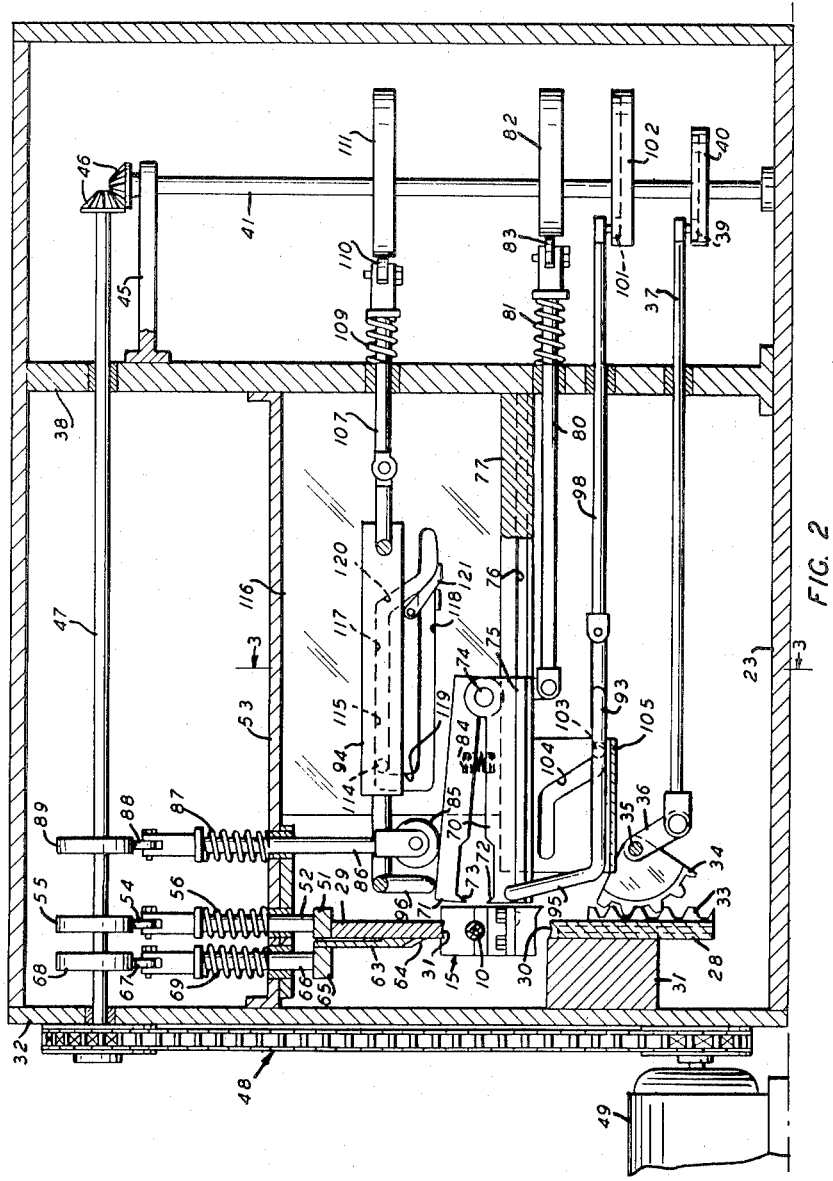

May 1, 1956

W. L. AMES 2,743,632

JACKET STRIPPING APPARATUS

Filed July 17, 1953

INVENTOR
W. L. AMES

United States Patent Office 2,743,632
Patented May 1, 1956

2,743,632

JACKET STRIPPING APPARATUS

William L. Ames, Mystic, Conn., assignor to Western Electric Company, Incorporated, New York, N. Y., a corporation of New York Application July 17, 1953, Serial No. 368,787

9 Claims. (Cl. 81—9.51)

This invention relates to apparatus for stripping sections of the jacket from jacketed members, and more particularly to apparatus for removing sections of the jacket from jacketed cordage.

An object of the present invention is to provide new and improved apparatus for stripping sections of the jacket from jacketed members.

A further object of the invention is to provide new and effective apparatus for removing sections of the jacket from the core of jacketed cordage.

An apparatus illustrating certain features of the invention may be utilized to strip the jacket from an elongated core having a jacket thereon, and may include means for weakening a portion of the jacket on one side of the core, and means for gripping the weakened portion of the jacket on the other side of the core and for moving it away from the core to strip the jacket from the core.

Other objects and advantages of the invention will become apparent by reference to the following detailed description, when considered in conjunction with the accompanying drawings, illustrating a preferred embodiment of the invention, in which:

Fig. 2 is an enlarged, vertical, sectional view taken on the line 2—2 of Fig. 1;

Figure 1:
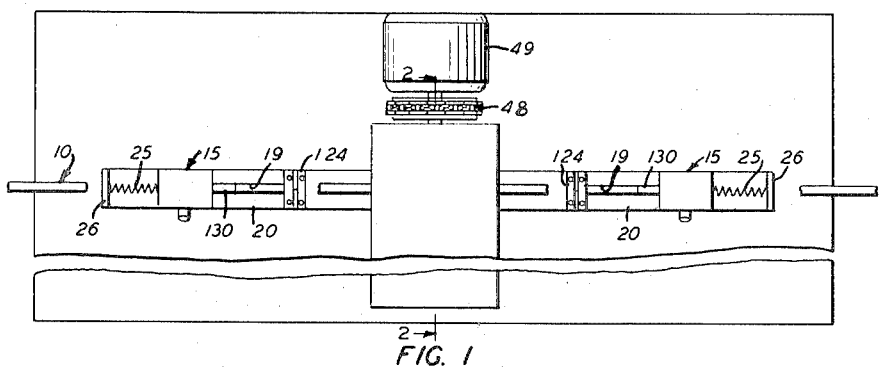
Fig. 1 is a plan view of the apparatus.

Referring to the drawings, the apparatus disclosed therein is adapted to receive a length of jacketed cordage 10 (Figs. 1 and 3) and strip the jacket 11 from a section of the jacketed cordage, which has a core 13 of individually insulated conductors enclosed within the jacket.

The cordage 10 is gripped by a pair of clamps 15 (Fig. 3) to support a section of the cordage therebetween from which the jacket 11 is to be stripped. Each of the clamps 15 comprises a lower jaw member 16 and an upper jaw member 17, the latter of which is removably secured to the lower jaw 16 by a latching device 18 to clamp the cordage therein. The clamps 15 are mounted for horizontal movement in guideways 19 formed in guide members 20, which are supported on a base 23 by blocks 24. Springs 25, connected at one end to the clamps 15 and the other end to brackets 26 mounted on the guide members 20, serve to move the clamps 15 to their outer positions and yieldably retain them there against stops 27 formed in the members 20.

Figures 6, 7:
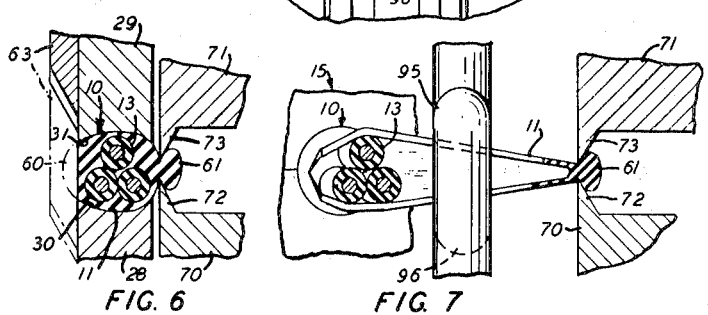
Figs. 6 and 7 are detailed, enlarged, fragmentary, vertical, sectional views showing parts of the apparatus in changed positions.

The intermediate portion of the section of the cordage which is to be stripped is adapted to be compressed between a pair of compressing members 28 and 29 (Fig. 2), which are positioned between the clamps 15. The compressing members 28 and 29 have relatively narrow curved surfaces 30 and 31 for compressing the cordage therebetween to cause portions of the jacket 11 to bulge outwardly on opposite sides of the core and the compressing members, as shown in Fig. 6. The lower compressing member 28 is guided for vertical movement in a guideway formed in a guide member 31 (Fig. 2) secured to a vertical wall 32, which is mounted on the base 23. The compressing member 28 carries a rack 33, which meshes with a segmental gear 34 mounted on a shaft 35. An arm 36 rigidly mounted on the shaft 35 is pivotally connected to a rod 37, which is slidably supported in a guide member formed in a vertical wall 38. A cam follower 39 on the other end of the rod 37 engages a groove in a rotary cam 40 secured on a cam shaft 41. The cam 40 and the cam follower 39 reciprocate the rod 37, and cause the segmental gear 34 to oscillate whereby the compressing member 28 is raised and lowered.

The shaft 41 is journalled in suitable bearings in the base 23 and in a bracket 45 mounted on the wall 38, and the shaft 41 is driven through a pair of bevel gears 46 from a cam shaft 47, which is journalled for rotation in the vertical walls 32 and 38. The cam shaft 47 is connected at the opposite end through a chain and sprocket drive 48 to a motor 49 (Figs. 1 and 2).

The upper compressing member 29 is connected to a plate 51 having a rod 52 mounted thereon. The rod 52 is guided for vertical movement in a suitable guide member in a horizontal frame member 53, is connected at its lower end to the upper end of the plate 51 and has a cam follower 54 on the upper end thereof engageable with a cam 55 on the cam shaft 47. The cam 55, in cooperation with a spring 56 on a rod 52, serves to reciprocate the rod 52 and the upper compressing member 29. Thus, in response to the actuation of the compressing members 28 and 29 from their open position shown in Fig. 2 to their closed position shown in Fig. 6, the cordage 10 is compressed and the jacket 11 is caused to protrude outwardly on each side of the core 13 and beyond the compressing members to form bulged portions 60 and 61 (Fig. 6).

Means are provided for weakening the jacket 11 along one side of the core 13 so that the other side of the jacket may be engaged and pulled away from the core to separate the weakened portion of the jacket from the core. The weakening of one side of a portion of the cord is accomplished by the action of a cutter 63, mounted for vertical reciprocal movement in sliding engagement with the upper compressing member 29. A sharp cutting edge 64 on the lower portion of the cutter 63 engages the bulged portion 60 of the jacket and longitudinally shears off the bulged portion in cooperation with the lower compressing member 28. The cutter 63 is mounted on a plate 65, which may be guided in suitable guideways in the horizontal frame member 53 and which has a rod 66 extending upwardly therefrom. A cam follower 67 on the rod 66 engages a cam 68 on the cam shaft 47, and a compression spring 69 cooperates with the cam to reciprocate the rod 66 and the cutter 63.

With a portion of the cordage compressed, as shown in Fig. 6, and in response to the actuation of the cutter 63, the bulged portion 60 is longitudinally sheared from the jacket 11 to weaken one wall portion of the jacket on one side of the core 13. The compressing members 30 and 31 and the cutter 63 are of a predetermined width and are designed to engage and weaken a predetermined length of the jacket 11.

A pair of gripping jaws 70 and 71 (Fig. 2), having sharp, hook-shaped ends 72 and 73, are provided for gripping the bulged portion 61 of the jacket 11 and pulling the weakened portion of the jacket from the core 13. The upper jaw 71 is pivotally connected at 74 to the lower jaw 70, which has laterally extending tongues 75 thereon slidable in grooves 76 in a pair of rails 77 for supporting the gripping jaws for horizontal movement. A rod 80, pivotally connected to the lower jaw 70, is urged for movement to the right, as viewed in Fig. 2, by a compression spring 81. A cam 82 mounted on the cam shaft 41 and engageable with a follower 83 on the rod cooperates with the spring 81 to reciprocate the gripping jaws 70 and 71.

A spring 84 seated in recesses in the jaws 70 and 71 urges the upper jaw 71 upwardly to its normal open position, as shown in Fig. 2, into engagement with a roller 85 mounted on the lower end of an actuating rod 86. The rod 86, which is guided for vertical movement in the frame member 53, is urged upwardly by a spring 87 to move a cam follower 88 mounted on the end of a rod against a cam 89 mounted on the cam shaft 47. The spring 87 and the cam 89 effect the oscillation of the upper jaw 71 to its open and closed position relative to the jaw 70.

With a portion of the cordage 10 compressed between the compressing members 30 and 31, as shown in Fig. 6, and while the bulged portion 60 is being cut by the cutter 63, the gripping jaws 70 and 71 are caused to move forward to position the hooked end portions 72 and 73 thereof vertically on opposite sides of the bulged portion 61 of the jacket 11. Then the cam 89 causes the jaw 71 to be actuated to closed position to grip the bulged portion 61 of the jacket between the end portions 72 and 73. With the jaws 70 and 71 in closed position and with the bulged portion 61 of the jacket gripped between the end portions thereof, the compressing members 28 and 29 are retracted from engagement with the cord. The jaws 70 and 71 then are moved to the right, as viewed in Fig. 2, to cause the weakened portion of the jacket 11 to be pulled away from the core 13. The roller 85 on the end of the rod 86 permits horizontal movement of the jaws 70 and 71 while they are in their closed position.

When the weakened portion of the jacket 11 has been separated from the core 13 to start the stripping operation, the stripping of the remainder of the jacket from the core in that section of the cordage 10 between the clamps 15 may be accomplished. This is done by effecting relative movement of the jacket 11 and the core 13 away from each other, thus causing the core to tear successive portions of the wall of the jacket as the jacket is stripped therefrom. The jaws 70 and 71, with the jacket 11 gripped therebetween, may be moved a distance sufficient to strip the jacket 11 from the core 13 along the entire length of the cord from which the jacket is to be stripped.

Figure 4:
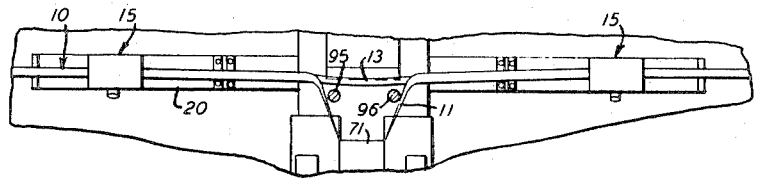
Fig. 4 is a fragmentary, horizontal, sectional view showing parts of the apparatus in changed positions.

In the embodiment of the invention disclosed herein, the gripping jaws 70 and 71 are not relied upon solely to strip the entire section of the jacket 11 from the core 13 but they are moved through a relatively short distance to separate only the weakened portion of the jacket from the core and to form a loop in the cordage, as shown in Figs. 4 and 7. To aid the gripping jaws 70 and 71 in the stripping operation, a pair of stripping elements 93 and 94 (Fig. 2) are provided. The stripping elements 93 and 94 have end portions 95 and 96, respectively, designed to be moved into the loop formed in the cordage and then moved horizontally in opposite directions to engage the core 13 and the jacket 11 and move them further apart to complete the stripping of the jacket 11 from the core 13 throughout the length of the section of the cordage 10 between the clamps 15.

Figure 3:
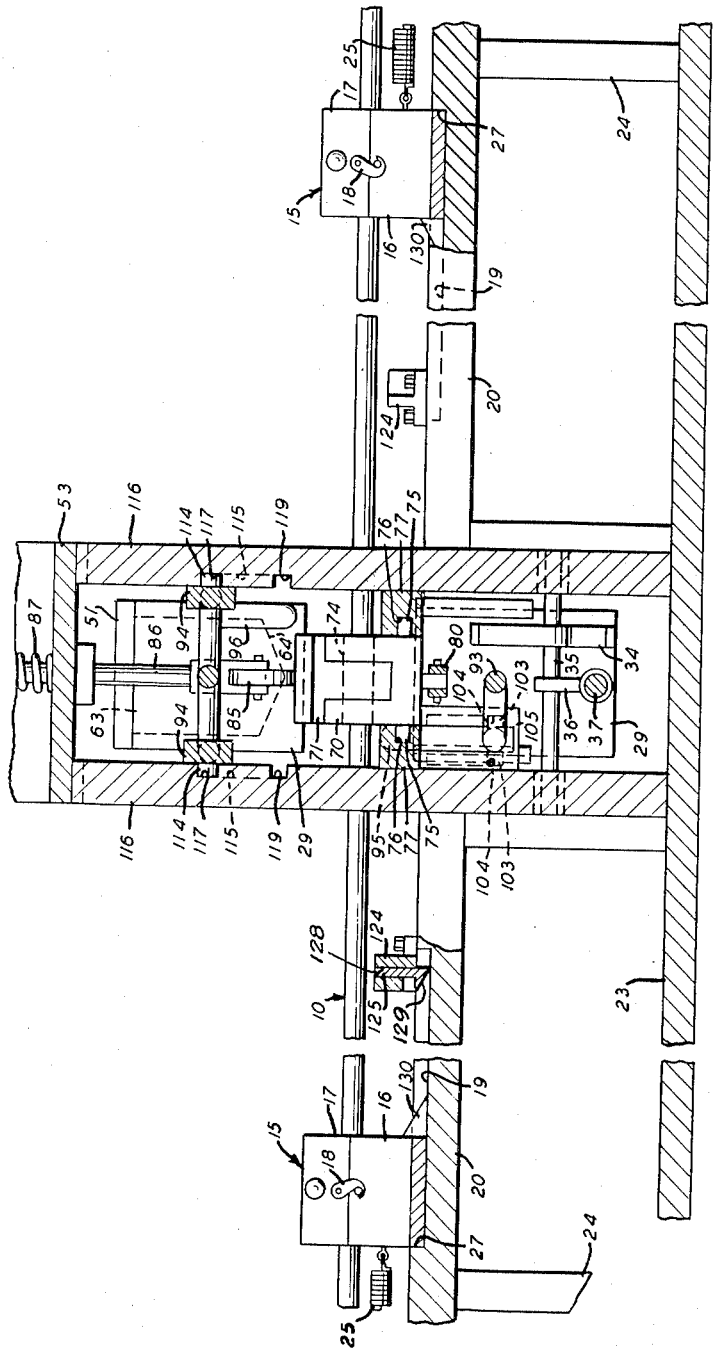
Fig. 3 is a vertical, cross-sectional view taken on the line 3—3 of Fig. 2.

The finger 95, which extends upwardly from the stripping element 93, is normally disposed below the elevation of the cordage 10 and is positioned at one side of the gripping jaws 70 and 71 (Fig. 3). At one end thereof, the stripping element 93 is connected to a rod 98, which is mounted for sliding movement in a guideway in the wall 38. A cam follower 101 mounted on the rod 98 engages a groove in a cam 102 positioned on the shaft 41, the cam 102 and the follower 101 cooperating to reciprocate the rod and the stripping element 93. A pair of laterally extending cam followers 103 on the stripping element 93 ride in a pair of cam grooves 104 formed in the walls of a U-shaped member 105 supported on the left hand rail 77, as seen in Fig. 3. The cam grooves 104 have upwardly inclined and horizontal portions designed to cause the stripping finger 95 to be moved upwardly into the loop in the cordage 10 and then horizontally to the left, as seen in Fig. 2, to engage and move the core 13 from a straight position, shown in Figs. 1 and 2, to the position shown in Fig. 5.

The finger 96, which extends downwardly from the stripping element 94, is normally positioned above the elevation of the cordage 10 and is disposed at the opposite side of the jaws 70 and 71 from that of the stripping finger 95. The stripping element 94 is pivotally connected to an actuating rod 107, which is slidably mounted in a guideway in the wall 38. The rod 107 is stressed by a spring 109 for movement in one direction to urge a cam follower 110 mounted on the rod 107 against a cam 111 secured on the cam shaft 41. The cam 111, in cooperation with the spring 109, serves to reciprocate the rod 107 and the upper stripping element 94. The stripping element 94 is shaped to provide clearance for the vertical rod 86 and the roller 85.

A pair of laterally extending cam followers 114 on the stripping element 94 ride in cam grooves 115 formed in vertically extending guide plates 116, which are mounted on the rails 77. The cam grooves 115 have a trapezoidal outline comprising a pair of horizontal parallel tracks 117 and 118, which are connected at one end by a vertical track 119 and are connected at the opposite end by an inclined track 120. Pawls 121 pivotally mounted on the plates 116 at the juncture of the horizontal and inclined tracks 118 and 120 are provided to cause the cam followers to ride up the inclined track 120 and ride around in the trapezoidal cam grooves 115 in one direction in response to the reciprocation of the stripping element 94.

From the position shown in Fig. 2, the stripping element 94 is advanced slightly to the left, as viewed in Fig. 2, to move the cam followers 114 into the track 119 to effect downward movement of the stripping element 94. The downward movement of the stripping element 94 positions the stripping finger 96 within the loop formed in the cordage 10 simultaneously with the upward movement of the stripping finger 95 into the loop. Thereafter, the upper gripping jaw 71 is actuated to open position to release the jacket 11 and cause it to contract into engagement with the stripping finger 96.

Figure 5:
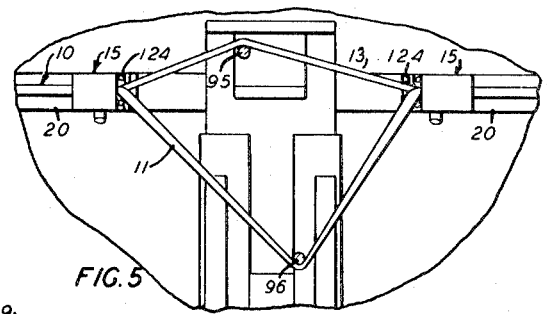
Fig. 5 is a view similar to Fig. 4 showing the parts in still other positions.

The stripping element 94 is then moved to the right, as viewed in Fig. 2, with the followers 114 moving horizontally in the tracks 118, causing the finger 96 to pull the jacket 11 from the core 13 into the position shown in Fig. 5. This movement occurs simultaneously with the movement of the core 13 in the opposite direction caused by the finger 95 to the position indicated in Fig. 5, thereby effecting the stripping of the jacket from the core throughout the length of the section of cordage between the clamps 15. During the stripping movement of the stripper fingers 95 and 96 to the position shown in Fig. 5, the tension applied to the clamps 15 by the jacket 11 and core 13 causes the clamps to move inwardly toward each other. This movement is arrested by the engagement of the clamps 15 with stop members 124 (Fig. 1) mounted on the guide members 20.

During the stripping movement of the stripping element 94 (to the right, as viewed in Fig. 2), the followers 114 swing the pawls 121 upwardly as they pass thereunder. On the return movement of the stripping element 94 (to the left, as viewed in Fig. 2), the cam followers 114 will ride up the inclined surfaces of the pawls 121 and along the cam track 120 into the horizontal track 117.

This movement raises the stripper finger 96 to its elevated position above the horizontal plane of the cordage 10 and returns the stripper element 94 to its original starting position, as shown in Fig. 2.

It will be understood that the drive mechanism including the various cams is designed to effect the actuation of the various elements of the apparatus in proper timed relation to each other.

Cutting means are provided for transversely cutting the jacket 11 adjacent to the clamps 15 to cause the severance of the stripped section of the jacket from the core. As shown herein, the cutting means comprises a pair of cutters 125 (Fig. 3) in the form of rectangular members mounted below the cordage for vertical reciprocation in guideways formed in the stop members 124. Each of the cutters is provided at its upper end with a sharp cutting edge 128 and at its lower end with an inclined surface 129. Cams 130 carried by the lower jaws 16 of the clamps 15 are adapted to engage the inclined surfaces 129 of the cutters 125 and to impart a predetermined upward movement to the cutters to cut the jacket 11 at points adjacent to the clamps 15, in response to the inward movement of the clamps.

Thus, as the jacket 11 and the core 13 are moved to the position shown in Fig. 5 by the stripping elements 93 and 94, and the clamps 15 are moved to their inner position against the stop members 124, the cutters 125 are actuated to engage the jacket. The cutters 125 partially sever and weaken the jacket 11 at the ends of the section of cordage between the clamps 15 and cause the stripped section of the jacket, which is in a stretched condition, to tear away from the rest of the jacket and become detached from the core 13 of the cordage 10. The stripping elements 93 and 94 are returned to their normal starting positions. As the stripping finger 95 is returned and tension on the core 13 is released, the springs 25 return the clamps 15 to their normal starting position, as shown in Fig. 3. The cutters 125 are returned to their lowermost position by gravity when they are disengaged by the clamps 15.

The motor 49 may be provided with a suitable control mechanism (not shown) whereby the motor may be started and will function to actuate the mechanism through one cycle of operation and stop at the end of the cycle. Thus, on completion of the cycle of operation, the jacket 11 of the section 12 of the jacket will have been removed from the cordage 10. The clamps 15 may then be opened and the cordage 10 moved therealong a predetermined distance to locate another section of the cordage in position to have the jacket stripped therefrom.

It is to be understood that the above-described arrangements are simply illustrative of the application of the principles of this invention. Numerous other arrangements may be devised by those skilled in the art which will embody the principles of the invention and fall within the spirit and scope thereof.

What is claimed is:

1. In an apparatus for stripping the jacket from the core of jacketed cordage, the combination of means for clamping the cordage at spaced points thereon to support a section of the cordage therebetween, means positioned between said spaced points for weakening a portion of the jacket on one side thereof, means opposed to the jacket-weakening means for gripping the other side of the weakened portion of the jacket, and means for moving said gripping means laterally to cause the jacket to be stripped from the core.

2. Apparatus for stripping a section of the jacket from the core of jacketed cordage, which comprises a pair of clamping members for clamping the cordage at spaced points to support a predetermined length of such cordage therebetween, means positioned between said clamping means for cutting a portion on one side of the jacket to weaken it at that point, means opposed to the cutting means for gripping the side of the jacket opposite to the weakened point and for moving it away from the core to strip the jacket therefrom, means for preventing lateral movement of the core as the jacket is stripped from the core, and resilient means for normally retaining the clamping members spaced apart a distance equal to said length of the cordage but yieldable to permit the clamps to move toward each other while the jacket is being stripped from the core whereby stretching of the core is prevented.

3. In an apparatus for stripping the jacket from the core of an elongated jacketed member, the combination of means for supporting a portion of the jacketed member at spaced points, means positioned between said points for longitudinally cutting a portion of the jacket on one side of said member to weaken the jacket, means opposed to the cutting means for gripping the other side of the weakened portion of the jacket and moving it away from said core to separate the weakened portion of the jacket from the core, a pair of stripping elements engageable with the separated portions of the jacket and the core, and means for effecting relative movement between said stripping elements to strip the jacket from the core between said points.

4. In a device for removing sections of the jacket from the core of jacketed cordage, the combination of means for gripping the cordage at spaced points to support therebetween the section of cordage from which the jacket is to be stripped, means for longitudinally cutting a portion of one side of the jacket on said section of the cordage between said points to weaken said portion of the jacket, means opposed to the cutting means for gripping the side of the jacket opposite to the weakened portion and moving it away from said core to strip the jacket from the core, means for restraining the core against movement with the jacket during the stripping of the jacket, and means for transversely cutting said jacket at the ends of said section of cordage to cause the severance of said section of the jacket from the cordage.

5. In a device for stripping sections of the jacket from the core of jacketed cordage, the combination of a means for circumferentially gripping the cordage at spaced points to support therebetween a section of the cordage from which the jacket is to be stripped, means positioned between said gripping means for compressing an intermediate portion of said section of the cord to cause portions of the jacket to bulge outwardly on opposite sides of the core, means for longitudinally cutting one of the bulged portions of the jacket to weaken one side of the jacket, means engageable with the other bulged portion of the jacket for effecting a connection therewith and for moving the jacket away from said core to strip the jacket from the core, means for preventing movement of the core with the jacket during the stripping of the jacket, and means for transversely cutting said jacket at the ends of said section of cordage to cause the severance of the stripped section of the jacket from the cordage.

6. An apparatus for stripping sections of the jacket from the core of jacketed cordage, comprising a pair of clamping members for clamping the cordage to support a section of cordage therebetween, a pair of compressing members intermediate the clamping members, means for actuating said compressing members to compress a portion of the cordage therebetween to cause portions of the jacket to bulge outwardly on opposite sides of the core, a cutter adjacent to the clamping members, means for actuating said cutter to longitudinally cut off the bulged portion of the jacket on one side thereof to weaken said jacket, gripping means for gripping the bulged portion on the other side of the jacket, means for actuating said gripping means to grip said jacket and move it away from said core to separate the weakened portion of the jacket from the core and to form a loop therein, a pair of stripping fingers adjacent to the gripping means, and means for moving said stripping fingers into said loop and into engagement with said jacket and said core and for moving said stripping fingers relative to each other to cause the stripping of the jacket from said conductors.

7. In an apparatus for stripping the jacket from the core of jacketed cordage, the combination of a pair of members engageable with the cordage at spaced points to support a section of cordage therebetween, a pair of compressing members intermediate the cordage-supporting members, means for actuating said compressing members to compress a portion of said section of cordage to form bulged portions in the jacket on opposite sides of the core, a cutter positioned for longitudinally cutting one of the bulged portions of the jacket to weaken said jacket on one side of the core, means for actuating said cutter, a pair of gripping members opposed to the cutter, means for actuating said gripping members to grip the other bulged portion of the jacket and move said jacket away from said core to separate the weakened portion of the jacket from the core and to form a loop therein, a pair of stripping fingers adjacent to the gripping members, means for moving said stripping fingers into engagement with the separated portions of the jacket and the core and then in opposite directions to cause the stripping of the jacket from the core throughout the length of said section of cordage, and means including a pair of cutters for transversely cutting the ends of the stripped portion of said jacket to sever the jacket from said section of cordage 8. An apparatus for stripping sections of the jacket from the core of jacketed cordage, comprising a pair of clamping members for clamping the cord at spaced points to support a section of the cordage therebetween, a first cutter positioned between said clamping members adjacent to the cordage held by the clamping members, means for actuating said cutter for longitudinally cutting one side of a portion of the jacket of said section of cordage to weaken that side of the jacket, a pair of gripping jaws opposed to the cutter, means for actuating said gripping jaws to grip the other side of the weakened portion of said jacket and move it laterally for separating the weakened portion of the jacket from the core, a pair of stripping elements adjacent to the gripping jaws, means for moving said stripping elements into engagement with the separated portion of the core and the jacket and then in opposite directions to separate the jacket from the core throughout the length of said section of cordage, a pair of second cutters for transversely cutting said jacket at said spaced points on the cordage, and means for actuating said second cutters to cut said jacket at said spaced points to effect the severance of the stripped portion of the jacket from said cordage.

9. An apparatus for stripping the jacket from the core of an elongated jacketed member, comprising a pair of clamping members for gripping said jacketed member at spaced points to support a section thereof from which the jacket is to be stripped, means mounting said clamping members for movement toward and away from each other to and from a normal outer position and an inner position, resilient means for yieldably retaining said clamping members in said outer position to support the jacketed member in a substantially straight line, a pair of compressing members intermediate said clamping members and operable for compressing a portion of said section of the jacketed member therebetween to form bulged portions on the jacket on opposite sides of the core, means for actuating said compressing members, a cutting element cooperable with one of said compressing members to cut the bulged portion of the jacket on one side of said core to weaken said jacket, means for actuating said cutting element, gripping elements operable to grip the other bulged portion of the jacket, means for actuating said gripping elements to grip the other bulged portion of the jacket and separate the weakened portion of the jacket from the core, a pair of stripping fingers adjacent to the gripping elements, means for moving said stripping fingers into engagement with the separated portions of the jacket and the core and then for moving said jacket and said core away from each other to cause the stripping of the jacket from said core along said section of the jacketed member and to cause the movement of said clamping members to said inner position, a pair of cutters for transversely cutting a portion of said jacket adjacent to said clamping members, and means for actuating said cutters to cut said jacket in response to the movement of said clamping members to said inner position.

References Cited in the file of this patent

UNITED STATES PATENTS

| | | |
|---|---|---|
| 1,052,271 | Pessin | Feb. 4, 1913 |
| 1,521,103 | Jacobson | Dec. 30, 1924 |
| 1,791,106 | Slugg | Feb. 3, 1931 |
| 1,929,915 | Deitz | Oct. 10, 1933 |
| 2,366,271 | Lerch | Jan. 2, 1945 |
| 2,485,518 | Vermette | Oct. 18, 1949 |
| 2,521,688 | Cataldo | Sept. 12, 1950 |